(12) United States Patent
Tang

(10) Patent No.: US 9,344,026 B2
(45) Date of Patent: May 17, 2016

(54) INDUCTION MOTOR FLUX AND TORQUE CONTROL

(71) Applicant: Atieva, Inc., Redwood City, CA (US)

(72) Inventor: Yifan Tang, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 290 days.

(21) Appl. No.: 13/948,326

(22) Filed: Jul. 23, 2013

(65) Prior Publication Data

US 2015/0028792 A1 Jan. 29, 2015

(51) Int. Cl.
*H02P 21/06* (2016.01)
*H02P 21/10* (2016.01)
*H02P 21/12* (2016.01)

(52) U.S. Cl.
CPC ............... *H02P 21/06* (2013.01); *H02P 21/10* (2013.01); *H02P 21/12* (2013.01)

(58) Field of Classification Search
CPC .................................. H02K 3/12; H02K 3/28
USPC ............................ 318/52, 432, 727, 802, 807
See application file for complete search history.

(56) References Cited

U.S. PATENT DOCUMENTS

| | | | | |
|---|---|---|---|---|
| 4,757,248 | A * | 7/1988 | Fujioka et al. | 318/807 |
| 5,032,771 | A * | 7/1991 | Kerkman et al. | 318/52 |
| 5,585,709 | A * | 12/1996 | Jansen et al. | 318/807 |
| 6,137,258 | A | 10/2000 | Jansen | |
| 6,222,335 | B1 * | 4/2001 | Hiti et al. | 318/432 |
| 6,388,419 | B1 * | 5/2002 | Chen et al. | 318/727 |
| 6,433,506 | B1 * | 8/2002 | Pavlov et al. | 318/804 |
| 6,965,212 | B1 | 11/2005 | Wang | |
| 7,023,168 | B1 | 4/2006 | Patel | |
| 7,187,155 | B2 | 3/2007 | Matsuo et al. | |
| 7,554,281 | B2 | 6/2009 | Satake et al. | |
| 7,745,949 | B2 | 6/2010 | Yang et al. | |
| 8,766,570 | B2 | 7/2014 | Geyer et al. | |
| 2009/0021208 | A1 * | 1/2009 | Romenesko et al. | 318/807 |
| 2012/0091941 | A1 * | 4/2012 | Hong | 318/766 |
| 2013/0154538 | A1 * | 6/2013 | Ogawa | 318/565 |
| 2013/0289934 | A1 | 10/2013 | Bazzi et al. | |

FOREIGN PATENT DOCUMENTS

WO WO 2006124010 11/2006

OTHER PUBLICATIONS

Notification of Transmittal of the International Search Report and the Written Opinion of the International Searching Authority, PCT/US2014/047659, mailed Oct. 30, 2014.
Notification of Transmittal of the International Search Report and Written Opinion of the International Searching Authority, PCT/US2014/047735, mailed Nov. 21, 2014.
Notification of Transmittal of the International Search Report and the Written Opinion of the International Searching Authority, PCT/US2015/018292, mailed May 29, 2015.

* cited by examiner

*Primary Examiner* — Bentsu Ro
*Assistant Examiner* — Devon Joseph
(74) *Attorney, Agent, or Firm* — Womble Carlyle Sandridge & Rice LLP

(57) ABSTRACT

An induction motor controller is provided. The induction motor controller includes a first module that derives a commanded stator voltage vector, in a stator flux reference frame, via a rotor flux regulator loop and a torque regulator loop, which process at least partially in the stator flux reference frame. The induction motor controller includes a second module that processes the commanded stator voltage vector to produce AC (alternating current) power for an induction motor.

21 Claims, 6 Drawing Sheets

INDUCTION MOTOR FLUX AND TORQUE CONTROL

CROSS REFERENCE TO RELATED APPLICATION

This application is related to U.S. application Ser. No. 13/948,330 entitled "Induction motor flux and torque control with rotor flux estimation," which is incorporated herein by reference for all purposes.

BACKGROUND

In an induction motor, AC (alternating current) electrical power energizes windings of a stator, creating a rotating magnetic field that is characterized as having a stator flux. The stator flux induces electric current in windings of the rotor. The rotor experiences a torque, and rotates under load at a rate that is slower than the rotation speed of the stator flux. The difference between the rotation rate of the rotor and the rotation rate of the stator flux is the slip speed, and the difference between positions of the rotor and the stator flux is called the slip angle. The changing flux that the rotor sees as a result of difference in rotation speed from the stator flux is called the rotor flux.

Two popular types of induction motor controllers, and the algorithms which these use, are direct torque control (DTC) and field oriented control (FOC). In DTC, torque and stator flux are controlled using coordinates in a stator alpha and beta reference frame, i.e. coordinates relative to the a phase of the stator, with calculations in a stationary coordinate system. In FOC, rotor flux, torque current quadrature component and rotor flux direct component are controlled using coordinates in a rotor flux d and q reference frame, i.e. coordinates relative to the direct and quadrature axes of the rotor flux, with calculations in a rotating coordinate system that rotates synchronously with the rotor flux. Each type of induction motor controller has advantages and disadvantages. Therefore, there is a need in the art for a solution which overcomes the drawbacks of the systems described above.

SUMMARY

In some embodiments, an induction motor controller is provided. The induction motor controller includes a first module that derives a commanded stator voltage vector, in a stator flux reference frame, via a rotor flux regulator loop and a torque regulator loop, which process at least partially in the stator flux reference frame. The induction motor controller includes a second module that processes the commanded stator voltage vector to produce AC (alternating current) power for an induction motor.

In some embodiments, an induction motor controller is provided. The induction motor controller includes a torque regulator that processes in a stator flux reference frame a commanded torque, a torque, a commanded rotor flux, and a rotational speed of a rotor of an induction motor to produce a commanded stator voltage projected onto a quadrature axis in the stator flux reference frame. The induction motor controller includes a rotor flux regulator that processes in the stator flux reference frame the commanded rotor flux and a rotor flux, to produce the commanded stator voltage projected onto a direct axis in the stator flux reference frame. The induction motor controller includes a stator flux reference frame to phase voltage reference frame vector rotation module that applies a stator flux angle to transform the commanded stator voltage, as projected onto the direct axis and the quadrature axis, from a first vector expressed in the stator flux reference frame to a second vector expressed in the phase voltage reference frame.

In some embodiments, a method of controlling an induction motor is provided. The method includes generating a stator voltage vector, in a stator flux reference frame and transforming the stator voltage vector from the stator flux reference frame to a phase voltage reference frame. The method includes producing alternating current (AC) power for an induction motor, from the stator voltage vector of the phase voltage reference frame, wherein at least one step of the method is performed by a processor.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
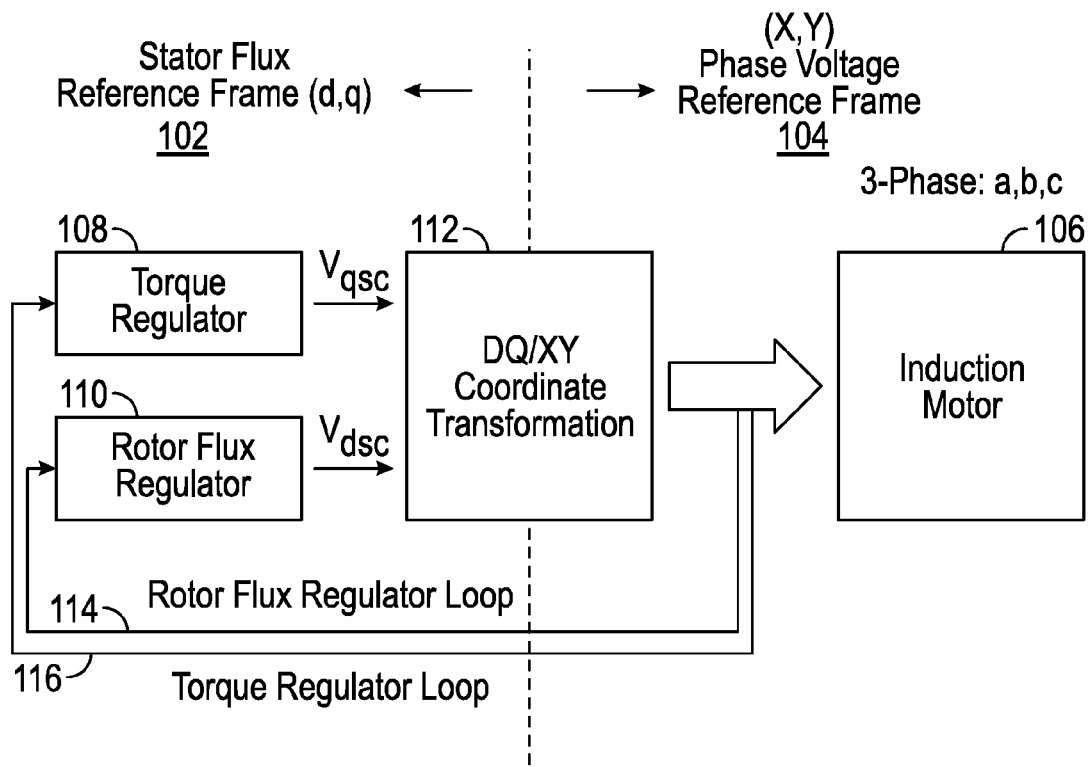
FIG. 1 is a schematic diagram of an induction motor controller in accordance with the present invention.

An induction motor controller, embodiments of which are shown in FIGS. 1-8 and described herein, has features and operation that differ from field oriented control (FOC) and direct torque control (DTC) induction motor controllers. The present induction motor controller performs rotor flux and torque control with a rotor flux regulator loop and a torque regulator loop, and operates in a stator flux reference frame and a phase voltage reference frame. The rotor flux and torque regulator loops are processed (at least partially) in the stator flux reference frame. This contrasts with DTC, which controls torque and stator flux, and performs calculations in a static (i.e., nonrotating) reference frame, and contrasts with FOC, which performs calculations in a reference frame aligned to the specific flux under control, among other differences. Controlling rotor flux as a regulated variable in a stator flux reference frame, in the present system, contrasts with other systems and methods which control rotor flux as a regulated variable in a rotor flux reference frame or which control stator flux as a regulated variable in a stator flux reference frame. Embodiments of the present induction motor controller can operate without current regulation loops, in contrast with FOC controllers many (or all) of which require current control.

A torque regulator and a flux regulator, in the present induction motor controller, generate a commanded stator voltage vector, which is expressed in the stator flux reference frame. This vector is rotated and transformed to a vector in the phase voltage reference frame, from which AC (alternating current) power to the induction motor is derived. Additional modules provide feedback for the torque regulator loop and the rotor flux regulator loop, as will be further described below.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 shows an induction motor controller that operates in the stator flux reference frame and the phase voltage reference frame. The induction motor controller provides AC (alternating current) electrical power to an induction motor 106, for example three-phase electrical power to a three-phase induction motor. A torque regulator 108 operates a torque regulator loop 116, and uses this to generate a commanded stator voltage vector as projected onto the quadrature (q) axis in the stator flux reference frame, which vector projection or component is denoted Vqsc. A rotor flux regulator 110 operates a rotor flux regulator loop 114, and uses this to generate the commanded stator voltage vector as projected onto the direct (d) axis in the stator flux reference frame, which vector projection or component is denoted Vdsc. The stator flux reference frame 102 will be further discussed regarding FIG. 2. Quantities in the stator flux reference frame 102 are identified as "dq" if a vector, or "d" if a direct component of a vector and "q" if a quadrature component of a vector.

Thus, the torque regulator 108 and the rotor flux regulator 110 together generate the commanded stator voltage vector Vdsc, Vqsc, expressed in the stator flux reference frame 102. Both the torque regulator 108 and the rotor flux regulator 110 operate in the stator flux reference frame 102. In the embodiment shown, the torque regulator 108 and flux regulator 110 are separate modules, but could be combined into a larger module. The commanded stator voltage vector Vdsc, Vqsc represents the stator voltage that is commanded by the induction motor controller, as determined in order to regulate the torque and the rotor flux of the induction motor 106. The DQ/XY coordinate transformation module 112 transforms the commanded stator voltage vector Vdsc, Vqsc from the stator flux reference frame 102 to the phase voltage reference frame 104, where the transformed vector Vxsc, Vysc is used to generate the AC power for the induction motor 106. In the embodiment shown, the induction motor 106 is a three-phase induction motor. The three phases are denoted a, b, c. Other numbers of phases and other denotations for the phases could be used.

Figure 2:
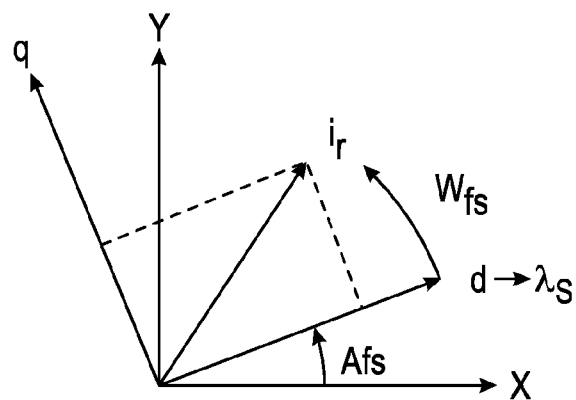
FIG. 2 is a vector diagram illustrating direct and quadrature (d and q) axes of a stator flux reference frame rotating with respect to x and y axes of a phase voltage reference frame, as referred to in the schematic diagram of FIG. 1.

FIG. 2 functions as a guide to understanding the reference frames, vectors, projections and embodiments of the induction motor controller as described herein. In FIG. 2, the x and y axes are orthogonal. The x and y axes are in the phase voltage reference frame. The x axis is aligned with one of the phase voltages of the stator of the induction motor, for example the phase voltage of the "A" winding of the stator. As AC power is applied to the stator windings, the stator flux linkage (i.e., the total magnetic flux linked by the stator windings) rotates relative to the phase voltage reference frame. This is depicted in the vector diagram as the d or direct axis rotating at a rotational speed or rotational rate of Wfs, the rotational speed of the stator flux. As is a common practice in the art, the term stator flux linkage is abbreviated to stator flux. The q or quadrature axis is perpendicular to the d axis. The q and d axes rotate together, which is symbolic of the stator flux reference frame rotating relative to the phase voltage reference frame. At any instant in time, the d axis is aligned with the stator flux and is angularly displaced from the x axis by a stator flux angle, denoted Afs. Equivalently, the stator flux angle Afs is the angle between the stator flux d axis and the x axis. At any instant in time, any vector quantity in either the stator flux space or the phase voltage space can be projected onto any of the axes. In the example shown, the rotor current, denoted ir, is projected onto the d axis and onto the q axis.

Figure 3:
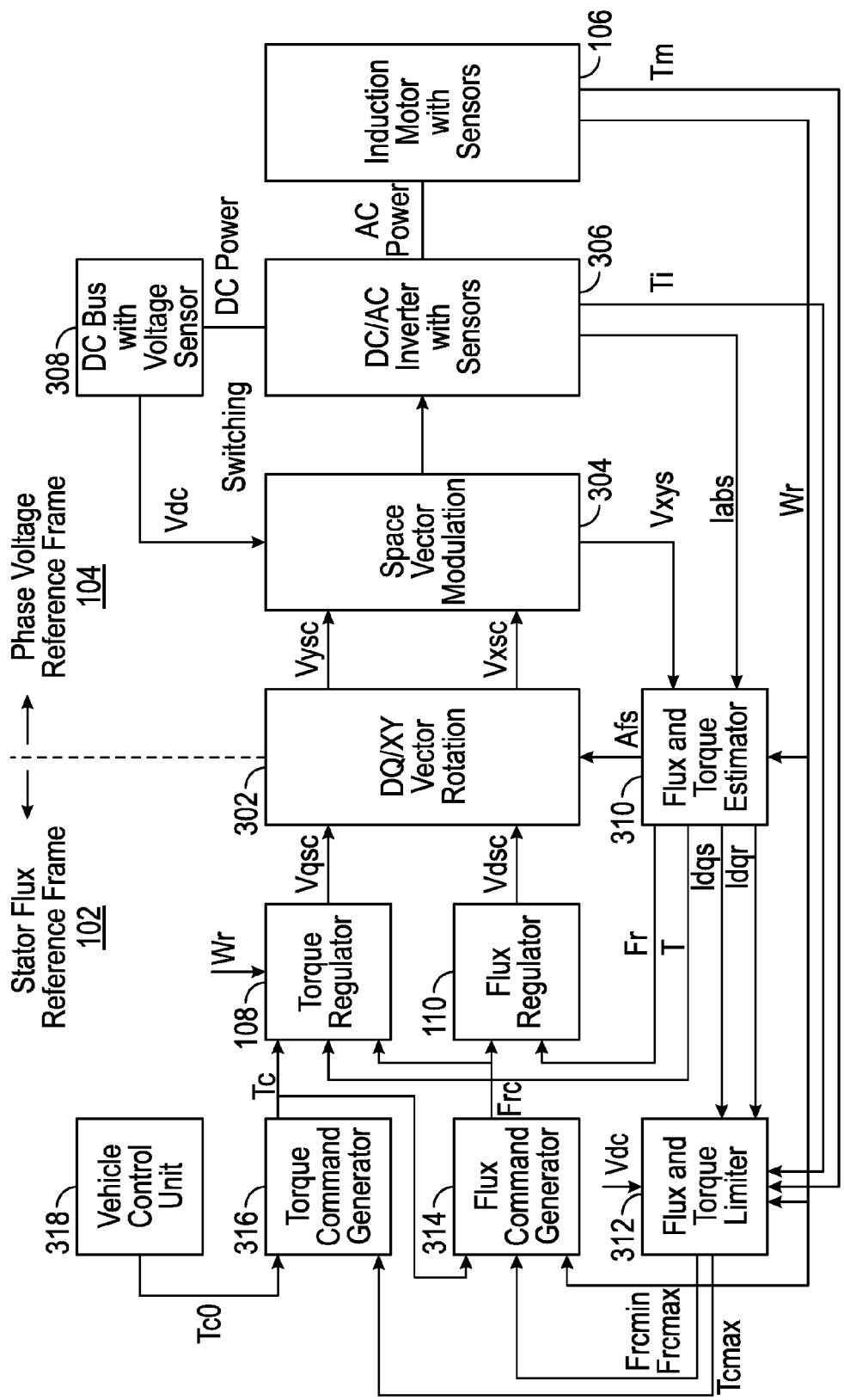
FIG. 3 is a schematic diagram of an embodiment of the induction motor controller of FIG. 1.

In FIG. 3, an embodiment of the induction motor controller of FIG. 1 is further developed. The induction motor controller of FIG. 3 is intended for use in an electric or hybrid vehicle, which is propelled by the induction motor 106. Further embodiments of the induction motor controller could be used in other applications of induction motors besides vehicles, for example in industrial applications, electromechanical machines and robotics. An overview of the modules, operation and control loops of the induction motor controller is presented below, then followed by a more in-depth discussion of these. It should be appreciated that the various variables, coefficients, intermediate values, inputs and outputs can be adjusted for dimensional compatibility or normalized, depending upon implementation, and that in various embodiments, modules may be combined or split, or modules may contain additional modules.

A vehicle control unit 318, a torque command generator 316, and a flux command generator 314 cooperate to produce a commanded torque Tc and a commanded rotor flux Frc. Generally, in an electric or hybrid vehicle, the commanded torque is based on input from a user, e.g., a driver of the electric vehicle or operator of an electromechanical device.

More specifically, the commanded torque would be based on position of an accelerator pedal and position of a brake pedal in the vehicle. These would be based on other inputs in other systems.

The commanded torque Tc and the commanded rotor flux Frc are input, along with loop variables, to the torque regulator 108 and the flux regulator 110. The torque regulator 108 and the flux regulator 110 together derive a commanded stator voltage vector, expressed in the stator flux reference frame, via a rotor flux regulator loop 114 and a torque regulator loop 116. The rotor flux regulator loop 114 and the torque regulator loop 116 process at least partially in the stator flux reference frame.

A DQ/XY vector rotation module 302, a space vector modulation module 304, and a DC/AC (direct current to alternating current) inverter 306 process the commanded stator voltage vector to produce AC (alternating current) power for the induction motor 106. The DQ/XY vector rotation module 302, which is one embodiment of the DQ/XY coordinate transformation module 112 of FIG. 1, transforms the commanded stator voltage vector from the stator flux reference frame 102 (as Vdsc, Vqsc) to the phase voltage reference frame 104 (as Vxsc, Vysc), applying vector rotation according to the stator flux angle Afs. The stator flux angle Afs is estimated rather than sensed, and is generated in the flux and torque estimator 310.

The space vector modulation module 304 module generates pulse width modulation (PWM) switching controls for the DC/AC inverter 306 from the commanded stator voltage vector Vxsc, Vysc as transformed to the phase voltage reference frame 104. The DC/AC inverter 306 generates three-phase AC power for the induction motor 106 from the pulse width modulation switching controls received from the space vector modulation module 304. In a further embodiment, the DC/AC inverter 306 generates other numbers of phases for the AC power for the induction motor 106, depending upon the design for the inverter 306 and the induction motor 106.

The flux and torque estimator 310 produces an estimated torque T, the estimated stator flux angle Afs, an estimated rotor flux magnitude Fr, an estimated stator current vector Idqs expressed in the stator flux reference frame 102, and an estimated rotor current vector Idqr expressed in the stator flux reference frame 102. It produces these from a stator voltage vector Vxys expressed in the phase voltage reference frame 104, a stator current Iabs of at least two phases, and a rotational speed Wr of the rotor of the induction motor. In the embodiment shown, the rotational speed Wr of the rotor is provided by a sensor such as a sensor associated with the induction motor 106. For example, the sensor could include or be part of a shaft encoder, a tachometer, a speedometer or other sensing device or assembly. The stator current could be provided as showing current in all three phases of the induction motor 106. However, as is well-known, providing values of the current of two phases allows deduction of the current in the third phase in a three-phase induction motor, since the vectors for these three currents add up to zero (with no net electrical charge buildup in, or loss from, the motor). In one embodiment, the stator current Iabs is provided by sensors, i.e. is a measured value.

The estimated rotor flux magnitude Fr is coupled from the flux and torque estimator 310 to the flux regulator 110. The estimated torque T is coupled from the flux and torque estimator 310 to the torque regulator 108. The estimated stator flux angle Afs is coupled from the flux and torque estimator 310 to the DQ/XY vector rotation module 302. The stator voltage vector Vxys expressed in the phase voltage reference frame 104 is produced by the space vector modulation module 304 from the commanded stator voltage vector Vdsc, Vqsc expressed in the stator flux reference frame 102. The stator current Iabs of at least two phases is provided by the DC/AC inverter 306 and is coupled as an input to the flux and torque estimator 310.

Figure 4:
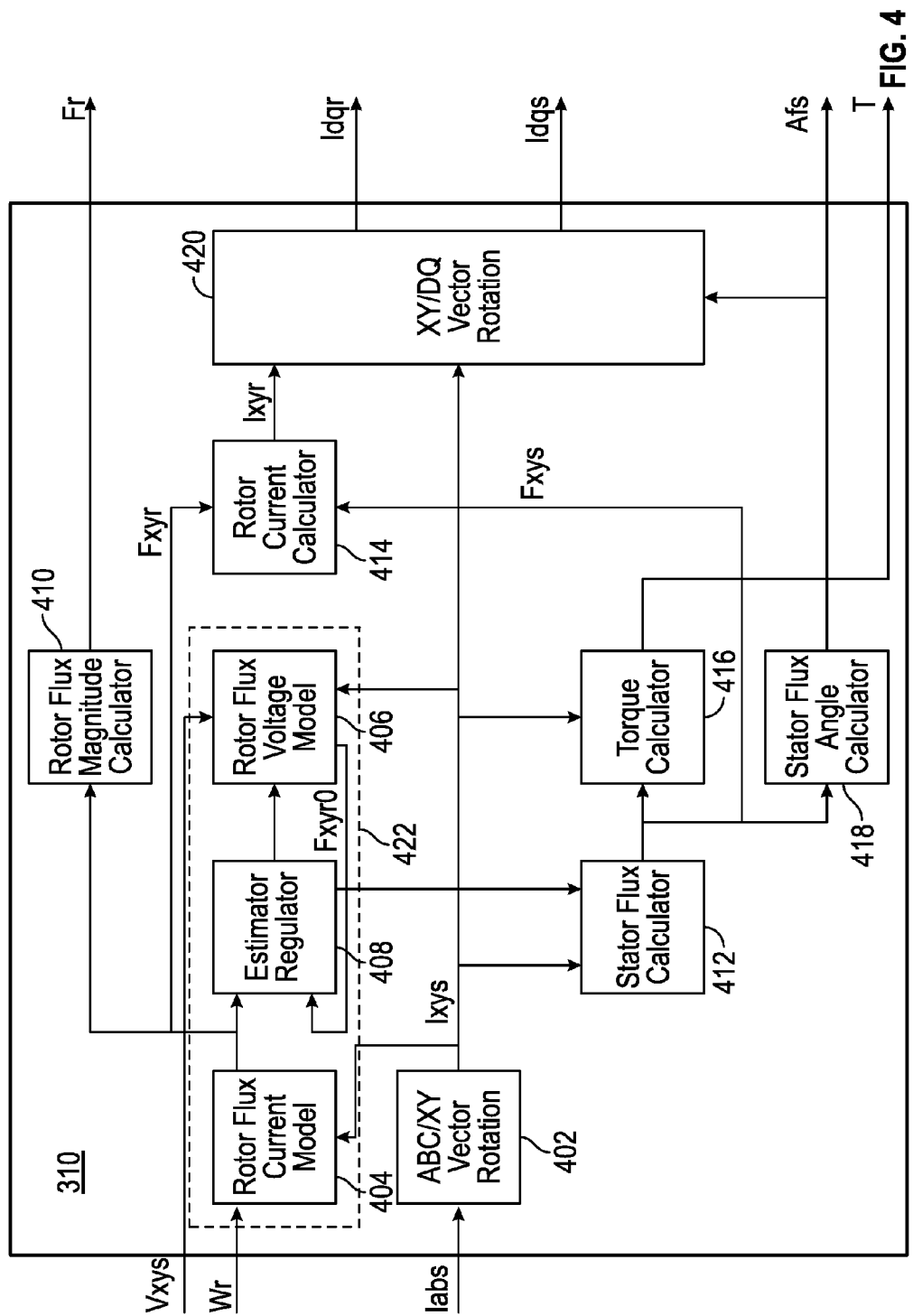
FIG. 4 is a schematic diagram of an embodiment of the flux and torque estimator of FIG. 3.

In one embodiment, which will be further discussed regarding FIG. 4, the flux and torque estimator 310 applies a rotor flux current model and a rotor flux voltage model to generate the estimated rotor flux magnitude Fr and the estimated torque T. Referring back to FIG. 1, the rotor flux regulator loop 114 includes the estimated rotor flux magnitude Fr as an input to the flux regulator 110, and the torque regulator loop 116 includes the estimated torque T as an input to the torque regulator 108.

Continuing with FIG. 3, the flux and torque limiter 312 works with the flux command generator 314, the torque command generator 316 and the vehicle control unit 318. These modules cooperate to generate the commanded torque Tc and the commanded rotor flux Frc, limiting the commanded torque Tc to less than or equal to a variable maximum commanded torque Tcmax and limiting the commanded rotor flux to greater than or equal to a variable minimum commanded rotor flux Frcmin and less than or equal to a variable maximum commanded rotor flux Frcmax. The commanded torque Tc is coupled from the torque command generator 316 as an input to the torque regulator 108. The commanded rotor flux Frc is coupled from the flux command generator 314 as an input to both the torque regulator 108 and the flux regulator 110. An embodiment of the flux and torque limiter 312 will be further discussed regarding FIG. 5.

The discussion of the induction motor controller of FIG. 3 begins with the vehicle control unit 318 and proceeds clockwise (in the diagram) around the rotor flux regulator loop and the torque regulator loop. Conceptually, at high level, a command for torque of the induction motor 106 is given by a user through the vehicle control unit 318. The command for torque is interpreted in terms of the state of the induction motor 106, more specifically in terms of the estimated rotor flux Fr and the estimated torque T of the induction motor 106. From the commanded torque Tc, the commanded rotor flux Frc is derived, and these are used for calculations or processing in the stator flux reference frame 102. After transformation from the stator flux reference frame 102 to the phase voltage reference frame 104, AC power for the induction motor 106 is generated. Variables are fed back through the rotor flux regulator loop and the torque regulator loop and used in the calculations or processing in the stator flux reference frame 102, completing the loops. The various modules could be produced as hardware, software, firmware, or combinations thereof in various embodiments. For example, in one embodiment, one or more of the modules is implemented using software in a digital signal processor (DSP). Embodiments can include one or more processors, or combinations of one or more processors and hardware.

The vehicle control unit 318 produces an initial commanded torque Tc0, based upon user input. In one embodiment, the commanded torque Tc0 is mapped from sensors coupled to the throttle and brake pedals of a vehicle. In further embodiments, the commanded torque Tc0 is calculated, derived, or mapped from other sensors or modules. For example, an increased commanded torque Tc0 is a result of a user requesting increased speed or acceleration of a vehicle, and a decreased commanded torque Tc0 is a result of a user requesting decreased speed or acceleration of the vehicle. In some embodiments, the vehicle control unit applies hysteresis in mapping to the commanded torque Tc0.

The torque command generator 316 generates the commanded torque Tc from a variable maximum commanded torque Tcmax and the initial commanded torque Tc0. The variable maximum commanded torque Tcmax is applied to the initial commanded torque Tc0 as a torque limit. This operation could be performed by a comparison and a mapping, which sends the initial commanded torque Tc0 through as the commanded torque Tc, unless the initial commanded torque Tc0 exceeds the variable maximum commanded torque Tcmax, in which case the variable maximum commanded torque Tcmax is sent through as the commanded torque Tc. In various embodiments, the torque command generator 316 runs at the same sampling rate as the main loop sampling rate, or a slower sampling rate as compared to the main loop sampling rate.

The flux command generator 314 generates the commanded rotor flux Frc from the variable minimum commanded rotor flux Frcmin, the variable maximum commanded rotor flux Frcmax, the commanded torque Tc and the rotational speed Wr of the rotor. The variable minimum commanded rotor flux Frcmin and the variable maximum commanded rotor flux Frcmax are applied to the commanded rotor flux Frc as flux limits. In one embodiment, the flux command generator 314 generates an initial commanded rotor flux from the commanded torque Tc, using the relationship that the product of the rotational speed Wr of the rotor times the rotor flux is the back EMF (electromotive force), which is directly related to torque. It is possible for an induction motor to produce a same given torque by operating with a range of different rotor flux, where different rotor flux results in different operating performance of the motor such as different operating efficiency or different rotor electrical power loss. Through real-time calculation or table lookup operation, from the commanded torque Tc the initial commanded rotor flux Frc can be obtained which optimizes a certain aspect of system operation (such as optimal motor efficiency). A comparison of the initial commanded rotor flux to the flux limits is then performed. The initial commanded rotor flux is sent through as the commanded rotor flux Frc, unless the initial commanded rotor flux is less than the variable minimum commanded rotor flux Frcmin, in which case the variable minimum commanded rotor flux Frcmin is sent through as the commanded rotor flux Frc. If the initial commanded rotor flux is greater than the variable maximum commanded rotor flux Frcmax, the variable maximum commanded rotor flux Frcmax, is sent through as the commanded rotor flux Frc. In various embodiments, the flux command generator 314 runs at the same sampling rate as the main loop sampling rate, or a slower sampling rate as compared to the main loop sampling rate.

The torque regulator 108 processes a portion of the torque regulator loop and produces the projection of the commanded stator voltage vector Vqsc onto the quadrature axis in the stator flux reference frame 102. The torque regulator 108 processes in the stator flux reference frame 102. Specifically, the torque regulator 108 processes the commanded torque Tc, the estimated torque T, the commanded rotor flux Frc, and the rotational speed Wr of the rotor of the induction motor 106, to produce the commanded stator voltage Vqsc as projected onto the quadrature axis in the stator flux reference frame 102. In one embodiment, the torque regulator 108 includes a PI (proportional-integral) controller. An embodiment of the torque regulator 108 will be further discussed with reference to FIG. 6.

The rotor flux regulator 110 processes a portion of the rotor flux regulator loop and produces a projection of the commanded stator voltage vector Vdsc onto the direct axis in the stator flux reference frame 102. The rotor flux regulator 110 processes in the stator flux reference frame 102. Specifically, the rotor flux regulator 110 processes the commanded rotor flux Frc and an estimated rotor flux magnitude Fr, to produce the commanded stator voltage Vdsc as projected onto the direct axis in the stator flux reference frame 102.

The DQ/XY vector rotation module 302 acts as a stator flux reference frame 102 to phase voltage reference frame 104 vector rotation module that applies the estimated stator flux angle Afs to the commanded stator voltage vector Vdsc, Vqsc as expressed in the stator flux reference frame 102. This application of the estimated stator flux angle Afs transforms the commanded stator voltage, as projected onto the direct axis and the quadrature axis, from a first vector Vdsc, Vqsc (i.e., the commanded stator voltage vector) in the stator flux reference frame 102 to a second vector Vxsc, Vysc (i.e., the commanded stator voltage vector) in the phase voltage reference frame 104. In one embodiment, this coordinate transformation applies an inverse Clarke transformation. In various embodiments, the coordinate transformation is performed using real-time calculation or a lookup table.

The space vector modulation module 304 generates pulse width modulation (PWM) switching controls. Further, the space vector modulation module 304 generates the stator voltage vector Vxys expressed in the phase voltage reference frame, as used by the flux and torque estimator 310. It generates these from the commanded stator voltage received as the second vector Vxsc, Vysc from the DQ/XY vector rotation module 302. In one embodiment, the PWM switching controls are normalized. In various embodiments, the stator voltage vector Vxys expressed in the phase voltage reference frame 104 is generated by multiplying a power supply voltage measurement Vdc and the commanded stator voltage vector Vxsc, Vysc expressed in the phase voltage reference frame 104, or the stator voltage vector Vxys expressed in the phase voltage reference frame 104 is measured (e.g., with a sensor) or estimated.

The DC bus 308 provides the power supply voltage measurement Vdc from a sensor. The DC bus in one embodiment is coupled to batteries or cells of the electric vehicle, which provide the DC power to the DC/AC inverter 306. In one embodiment, a sensor measures the voltage measurement Vdc of the DC bus 308.

The DC/AC inverter 306 generates three-phase AC power for the induction motor 106 from the PWM switching controls received from the space vector modulation module 304. In one embodiment, a sensor measures the inverter temperature Ti, which is sent to the flux and torque limiter 312. In one embodiment, sensors measure stator current Iabs of at least two of the phases of the stator, and send this to the flux and torque estimator 310.

In the embodiment shown, the induction motor 106 is equipped with sensors. One sensor measures the motor temperature Tm, and sends this to the flux and torque limiter 312. One sensor measures the rotational speed Wr of the rotor, and sends this to the flux and torque estimator 310, the flux and torque limiter 312, and the flux command generator 314.

The flux and torque estimator 310 generates the estimated stator flux angle Afs for the DQ/XY vector rotation module 302, the estimated rotor flux Fr for the flux regulator 110, the estimated torque for the torque regulator 108, and the stator current vector Idqs expressed in the stator flux reference frame 102 and the rotor current vector Idqr expressed in the stator flux reference frame 102 for the flux and torque limiter 312. One embodiment of the flux and torque estimator 310 employs two distinct rotor flux models, as will be discussed regarding FIG. 4.

The flux and torque limiter 312 generates the variable minimum commanded rotor flux Frcmin, the variable maximum commanded rotor flux Frcmax, and the variable maximum commanded torque Frcmax. It generates these from the stator current vector Idqs expressed in the stator flux reference frame 102, the estimated rotor current vector Idqr expressed in the stator flux reference frame 102, the inverter temperature Ti, the motor temperature Tm, the rotational speed Wr of the rotor, and the measured DC voltage Vdc of the DC bus 308. The torque limit, namely the variable maximum commanded torque Tcmax, is sent from the flux and torque limiter 312 to the torque command generator 316. The lower and upper rotor flux limits, namely the variable minimum commanded rotor flux Frcmin and the variable maximum commanded rotor flux Frcmax, are sent from the flux and torque limiter 312 to the flux command generator 314.

Thus, the rotor flux regulator loop 114 and the torque regulator loop 116 are closed via the flux and torque estimator 310, the flux regulator 110 and the torque regulator 108, with limits imposed via the flux and torque limiter 312, the flux command generator 314 and the torque command generator 316. In order to close the loops, allowing feedbacks to cross from the phase voltage reference frame 104 back to the stator flux reference frame 102, one embodiment of the flux and torque estimator 310 includes a phase voltage reference frame to stator flux reference frame vector rotation module that transforms current vectors from the phase voltage reference frame 104 to the stator flux reference frame 102. An embodiment of the flux and torque limiter 312 will be further discussed regarding FIG. 5.

FIG. 4 shows an embodiment of the flux and torque estimator 310. Modules in the flux and torque estimator 310 are implemented in software, hardware, firmware, and various combinations thereof in various embodiments. For example, a module could be implemented as a software module executing in a DSP or other processor. In various embodiments, the rotor flux current model 404, the rotor flux voltage model 406, the rotor flux magnitude calculator 410, the rotor current calculator 414, the stator flux calculator 412, the torque calculator 416 and the stator flux angle calculator 418 are each lookup-table-based or real-time-calculation-based.

The ABC/XY vector rotation module 402 acts as a stator phase current reference frame to phase voltage reference frame 104 vector rotation module that transforms a stator current Iabs of at least two phases to a stator current vector Ixys expressed in the phase voltage reference frame 104. In one embodiment, this is performed using a Park's transformation or variation thereof.

In the embodiment of the flux and torque estimator 310 shown in FIG. 4, two rotor flux models cooperate with a regulator to form estimates of rotor flux vectors. The rotor flux current model 404 converges more quickly than does the rotor flux voltage model 406. Combining the two rotor flux models improves accuracy of the system in a wide range of operating condition, i.e., over a wide range of motor speed and over a wide range of motor toque. Also, combining the two rotor flux models allows the various estimated result to be based on voltage, current and speed rather than just two out of three of these variables.

The rotor flux current model 404 generates a fast-convergence estimated rotor flux vector Fxyr expressed in the phase voltage reference frame 104. It generates this from the stator current vector Ixys, expressed in the phase voltage reference frame 104, and the rotational speed of the rotor Wr.

The rotor flux voltage model 406 generates a slow-convergence estimated rotor flux vector Fxyr0 expressed in the phase voltage reference frame 104. It generates this from the stator voltage vector Vxys expressed in the phase voltage reference frame 104, the stator current vector Ixys expressed in the phase voltage reference frame 104, and an estimation correction factor.

The estimator regulator 408 generates the estimation correction factor from the fast-convergence estimated rotor flux vector Fxyr expressed in the phase voltage reference frame 104 and the slow-convergence estimated rotor flux vector Fxyr0 expressed in the phase voltage reference frame 104. In one embodiment, the estimator regulator 408 includes a PI (proportional-integral) controller. The PI controller could form an error term from the difference between the fast-convergence estimated rotor flux vector Fxyr expressed in the phase voltage reference frame 104 and the slow-convergence estimated rotor flux vector Fxyr0 expressed in the phase voltage reference frame 104. This error term could then be sent to a proportional module and an integral module, the outputs of which are summed to form the estimation correction factor. A PI controller is described with reference to FIG. 6 and an embodiment of the torque regulator 108.

Continuing with FIG. 4, four calculators in the flux and torque estimator 310 could be implemented using the calculating facilities of a DSP or other processor, or a hardware multiplier, or one or more lookup tables. The calculators could share a facility or each have a respective calculating facility. The rotor flux magnitude calculator 410 generates the estimated rotor flux magnitude Fr from the fast-convergence estimated rotor flux vector Fxyr0 expressed in the phase voltage reference frame 104. The stator flux calculator 412 generates an estimated stator flux vector Fxys expressed in the phase voltage reference frame 104 from the slow-convergence estimated rotor flux vector Fxyr0 expressed in the phase voltage reference frame 104 and the stator current vector Ixys expressed in the phase voltage reference frame 104. In one embodiment, the stator flux calculator 412 includes a model of inductances for windings of the stator of the induction motor. The rotor current calculator 414 generates an estimated rotor current vector Ixyr expressed in the phase voltage reference frame 104 from the fast-convergence estimated rotor flux vector Fxyr expressed in the phase voltage reference frame 104 and the estimated stator flux vector Fxys expressed in the phase voltage reference frame 104. The torque calculator 416 generates the estimated torque T from the stator current vector Ixys expressed in the phase voltage reference frame 104 and the estimated stator flux vector Fxys expressed in the phase voltage reference frame 104. The stator flux angle calculator 418 generates the estimated stator flux angle Afs from the estimated stator flux vector Fxys expressed in the phase voltage reference frame 104.

The XY/DQ vector rotation module 420 acts as a phase voltage reference frame 104 to stator flux reference frame 102 vector rotation module that generates the estimated rotor current vector Idqr expressed in the stator flux reference frame 102 and the stator current vector Idqs expressed in the stator flux reference frame 102. It generates these from the estimated rotor current vector Ixyr expressed in the phase voltage reference frame 104, the stator current vector Ixys expressed in the phase voltage reference frame 104, and the estimated stator flux angle Afs. In one embodiment, the XY/DQ vector rotation module 420 employs a Clarke transformation.

Figure 5:
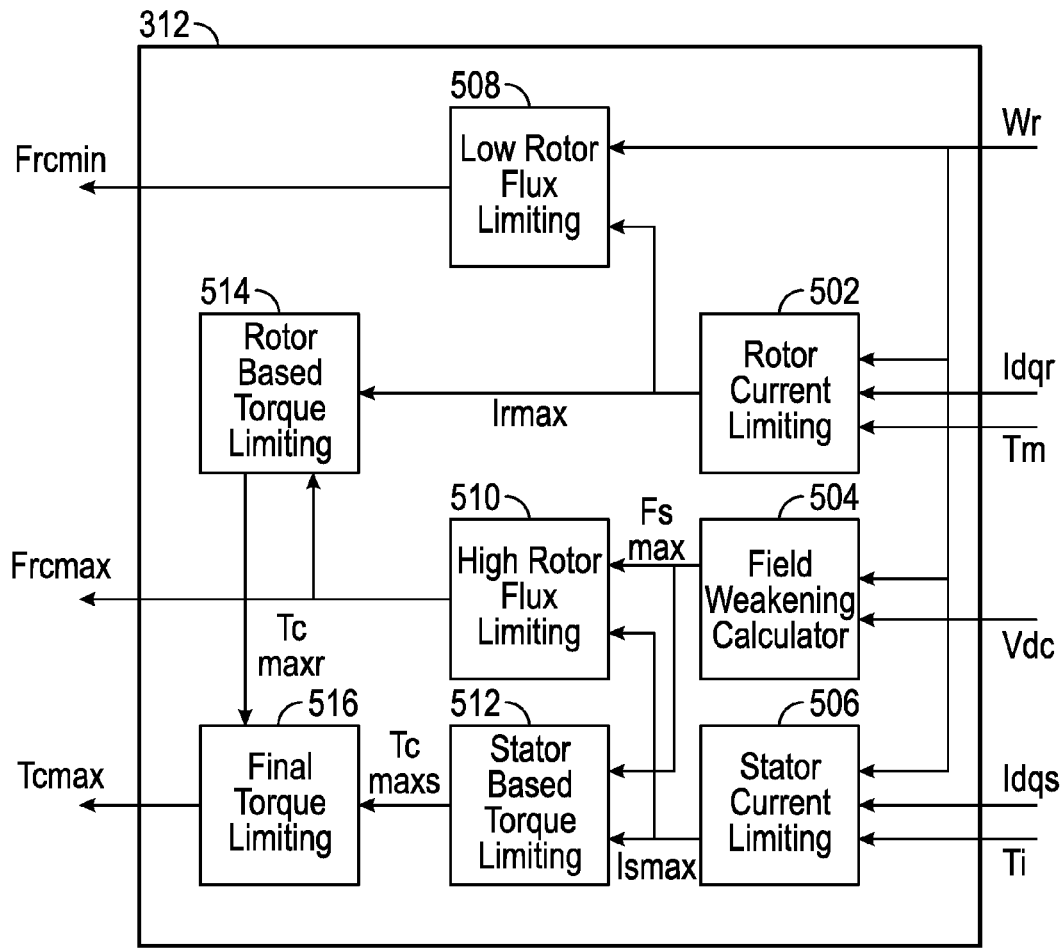
FIG. 5 is a schematic diagram of an embodiment of the flux and torque limiter of FIG. 3.

FIG. 5 shows one embodiment of the flux and torque limiter 312. Some of the modules and the flux and torque limiter 312 have a calculator, which could be implemented similarly to the calculators in the flux and torque estimator 310. Modules in the flux and torque limiter 312 are implemented in software, hardware, firmware, and various combinations thereof in various embodiments. In various embodiments, each of the rotor current limiter, the field weakener, the stator current limiter, the low rotor flux limiter, the high rotor flux limiter, the stator-based torque limiter, and the rotor-based torque limiter is lookup-table-based or real-time-calculation-based. In various embodiments, the flux and torque limiter 312 runs at the same sampling rate as the main loop sampling rate, or a slower sampling rate as compared to the main loop sampling rate.

The rotor current limiter 502 generates a variable maximum rotor current Irmax from the rotational speed Wr of the rotor, the estimated rotor current vector Idqr expressed in the stator flux reference frame 102, and the motor temperature Tm. The motor temperature Tm is affected by the rotor current and the rotational speed Wr of the rotor. In one embodiment, the rotor current limiter 502 decreases the variable maximum rotor current Irmax in response to an increased motor temperature Tm. This protects the rotor, and the induction motor 106, from overheating as a result of too much rotor current. In one embodiment, the rotor current limiter 502 includes a calculator.

The field weakener 504 generates a variable maximum stator flux Fsmax from the rotational speed Wr of the rotor and the DC voltage Vdc of the DC bus 308 or other power source for the induction motor 106. In one embodiment, the field weakener 504 decreases the variable maximum stator flux Fsmax in response to the rotational speed of the rotor Wr exceeding a base speed. The field weakener 504 further decreases the variable maximum stator flux Fsmax in response to a decreasing DC voltage of the power source for the induction motor 106. Some motors become unstable for too high values of stator flux. For example, the induction motor could readily withstand a maximum stator flux up to a base speed of the motor, but become unstable at lesser values of stator flux for higher rotational speeds. In one embodiment, a lower DC voltage decreases the maximum available flux at higher RPMs of the rotor. As a further example, in some induction motors the maximum stator flux should be lowered for lower values of power supply voltage, past some base value of rotational speed of the rotor. Various maps are readily devised for the field weakener 504, depending upon characteristics of a specified induction motor 106. In one embodiment, the field weakener 504 includes a calculator.

The stator current limiter 506 generates a variable maximum stator current Ismax from the rotational speed of the rotor Wr, the stator current vector Idqs expressed in the stator flux reference frame 102, and an inverter temperature Ti. The inverter temperature Ti is affected by the stator current and by the rotational speed of the rotor Wr. In one embodiment, the stator current limiter 506 decreases the variable maximum stator current Ismax in response to an increased inverter temperature Ti. This protects the stator and the induction motor 106 from overheating as a result of too high a stator current.

The low rotor flux limiter 508 generates a variable minimum commanded rotor flux Frcmin from the variable maximum rotor current Irmax and the rotational speed of the rotor Wr. In one embodiment, the low rotor flux limiter 508 sets the variable minimum commanded rotor flux Frcmin consistent with readiness to accelerate the rotor. For example, because rotor current is induced in an induction motor, having too low a rotor flux results in a low rotor current, which will give slow responsiveness to commands to increase the torque of the induction motor. Another reason to set the variable minimum commanded rotor flux Frcmin is to maintain stability or robustness of the motor against sudden changes in shaft load as well as other disturbances. Setting a minimum commanded rotor flux prepares the induction motor to respond more quickly to a command to increase the torque and to maintain torque and speed despite disturbances. This minimum is dependent on motor design and also on operating situation, in some embodiments.

The high rotor flux limiter 510 generates the variable maximum commanded rotor flux Frcmax from the variable maximum stator flux Fsmax and the variable maximum stator current Ismax. In one embodiment, the high rotor flux limiter 510 sets the variable maximum commanded rotor flux Frcmax based upon the variable maximum stator flux Fsmax and the variable maximum stator current Ismax, so as to decrease the variable maximum commanded rotor flux Frcmax in response to either the variable maximum stator flux Fsmax or the variable maximum stator current Ismax being decreased.

The stator-based torque limiter 512 generates a variable maximum stator-based commanded torque Tcmaxs from the variable maximum stator flux Fsmax and the variable maximum stator current Ismax. In one embodiment, the stator-based torque limiter 512 sets the variable maximum stator-based commanded torque Tcmaxs based upon a product of the variable maximum stator flux Fsmax and the variable maximum stator current Ismax. In one embodiment, the stator-based torque limiter 512 includes a calculator.

The rotor-based torque limiter 514 generates a variable maximum rotor-based commanded torque Tcmaxr from the variable maximum rotor current Irmax and the variable maximum commanded rotor flux Frcmax. In one embodiment, the rotor-based torque limiter that sets the variable maximum rotor-based commanded torque Tcmaxr based upon a product of the variable maximum rotor current Irmax and the variable maximum commanded rotor flux Frcmax. In one embodiment, the rotor-based torque limiter 514 includes a calculator.

The final torque limiter 516 generates the variable maximum commanded torque Tcmax from the variable maximum rotor-based commanded torque Tcmaxr and the variable maximum stator-based commanded torque Tcmaxs. In one embodiment, the final torque limiter 516 sets the variable maximum commanded torque Tcmax by selecting the lesser of the variable maximum rotor-based commanded torque Tcmaxr and the variable maximum stator-based commanded torque Tcmaxs. For example, torque can be calculated by stator flux and stator current, or by rotor flux and rotor current. Comparing the two calculation results for torque and picking the lower one for a torque limit is a more conservative choice for stability purposes. In further embodiments, the greater of the two, an average of the two, or a weighted average of the two could be selected.

Figure 6:
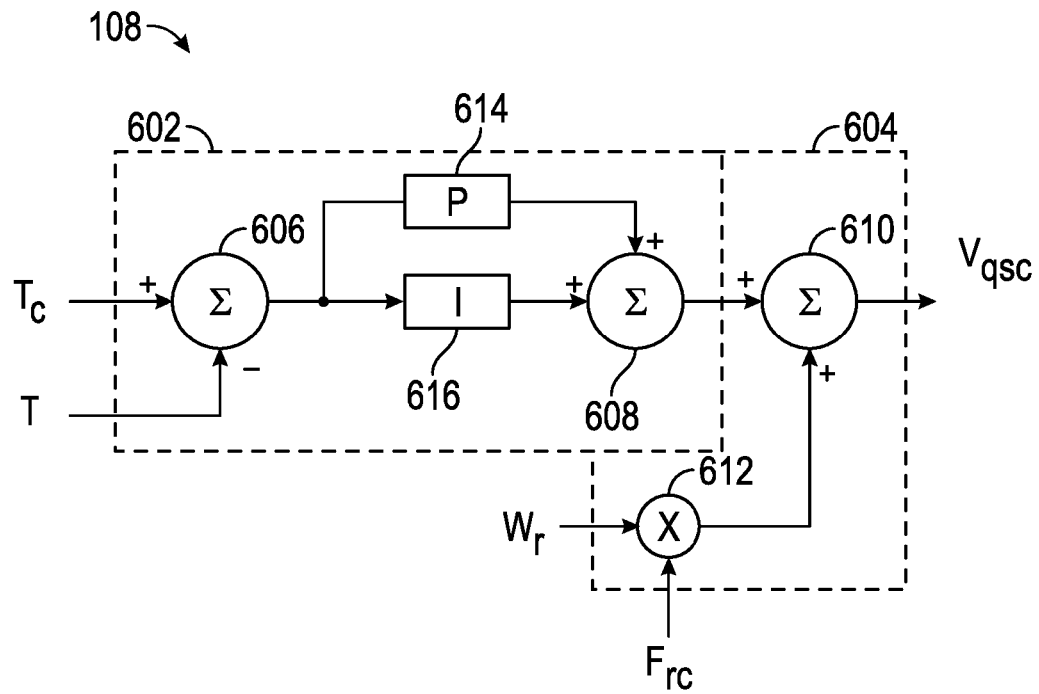
FIG. 6 is a schematic diagram of an embodiment of the torque regulator of FIGS. 1 and 3.

FIG. 6 shows an embodiment of the torque regulator 108 from FIGS. 1 and 3. In this embodiment, the torque regulator 108 includes a proportional-integral (PI) controller 602. The PI controller 602 has a difference between the commanded torque Tc and the estimated torque T as an input. This difference, an error term in PI controller terminology, is shown as a summation 606 of the commanded torque Tc, as a positive input, and the estimated torque T as a negative input. The output of the summation 606 produces the torque error. The torque error is routed to a proportional module 614, which produces a factor that is proportional to the summation 606 output (i.e., proportional to the torque error), and an integral module 616, which produces a factor that is proportional to the integral of the summation 606 output (i.e., proportional to the integral of the torque error). The output of the proportional module 614 and the output of the integral module 616 are added by a summation 608 to produce the output of the PI controller 602.

In the embodiment shown in FIG. 6, the torque regulator 108 includes a feedforward module 604. The feedforward module 604 includes a summation 610 having as inputs the output of the PI controller 602 and a product of the commanded rotor flux Frc and the rotational speed of the rotor Wr. The feedforward summation 610 has as an output the commanded stator voltage Vqsc as projected onto the quadrature axis in the stator flux reference frame 102. In a further embodiment, the output summation 608 of the PI controller is combined with the feedforward summation 610 of the feedforward module 604, as a single summation with three inputs.

Figure 7:
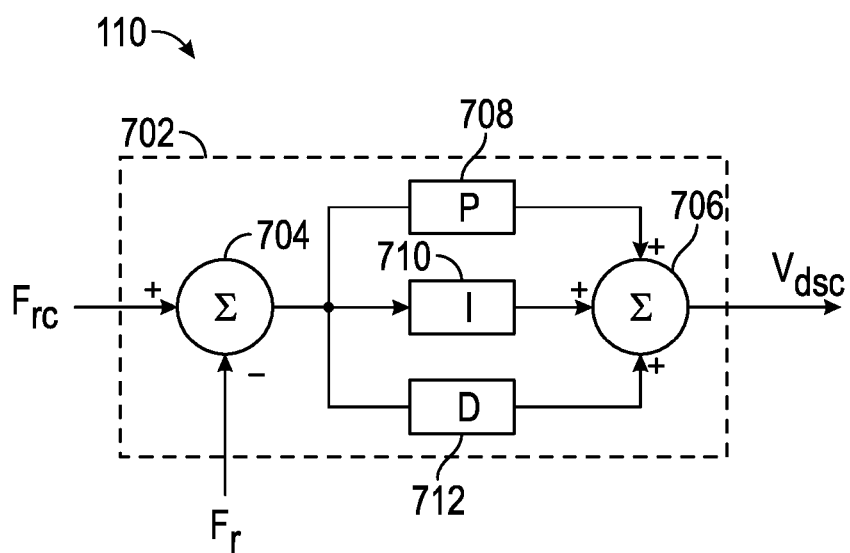
FIG. 7 is a schematic diagram of an embodiment of the flux regulator of FIGS. 1 and 3.

FIG. 7 shows an embodiment of the rotor flux regulator 110 from FIGS. 1 and 3. In this embodiment, the rotor flux regulator 110 includes a proportional-integral-derivative (PID) controller 702 having as inputs the commanded rotor flux Frc and the estimated rotor flux Fr, and having as an output the commanded stator voltage Vdsc projected onto the direct axis in the stator flux reference frame 102. The input summation 704 has the commanded rotor flux Frc as a positive input and the estimated rotor flux Fr as a negative input. The output of the input summation 704 produces an error term, in PID controller terminology, in this case a flux error. The flux error is routed to a proportional module 708, which produces a term that is proportional to the summation 704 output (i.e., proportional to the flux error), an integral module 710, which produces a term that is proportional to the integral of the summation 704 output (i.e., proportional to the integral of the flux error), and a derivative module 712, which produces a term that is proportional to the derivative of the summation 704 output (i.e., proportional to the derivative of the flux error). The output of the proportional module 708, the output of the integral module 710, and the output of the derivative module 712, are added by an output summation 706 to produce the output of the PID controller 702, which is the commanded stator voltage Vdsc projected onto the direct axis in the stator flux reference frame 102.

Figure 8:
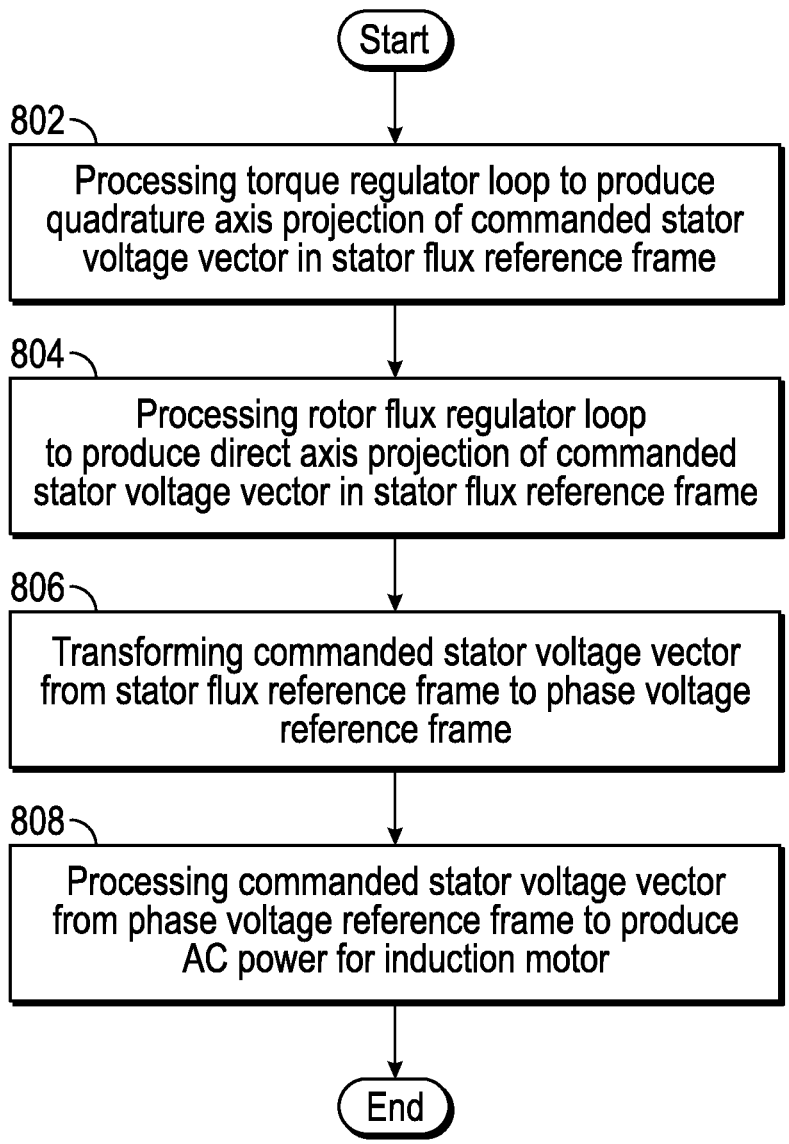
FIG. 8 is a flow diagram of a method of controlling an induction motor, which can be practiced on embodiments of the induction motor controller of FIGS. 1 and 3-7.

FIG. 8 shows an embodiment of a method of controlling an induction motor. The method can be practiced on embodiments of the induction motor controller, including those described with reference to FIGS. 1-7. A processor could perform one or more steps of the method, in various embodiments.

In an action 802, a torque regulator loop is processed to produce a quadrature axis projection of a commanded stator voltage vector in a stator flux reference frame. For example, the torque regulator produces such a voltage vector projection. As shown in FIG. 3, the torque regulator processes in the stator flux reference frame the commanded torque, the estimated torque, the commanded rotor flux, and the rotational speed of the rotor of the induction motor, as part of the torque regulator loop, to produce the quadrature axis projection of the commanded stator voltage vector in the stator flux reference frame.

In an action 804, a rotor flux regulator loop is processed to produce a direct axis projection of a commanded stator voltage vector in the stator flux reference frame. For example, the rotor flux regulator produces such a voltage vector projection. As shown in FIG. 3, the rotor flux regulator processes in the stator flux reference frame the commanded rotor flux and the estimated rotor flux, as part of the rotor flux regulator loop, to produce the direct axis projection of the commanded stator voltage vector in the stator flux reference frame.

In an action 806, the commanded stator voltage vector is transformed from the stator flux reference frame to a phase voltage reference frame. For example, the DQ/XY coordinate transformation module or the DQ/XY vector rotation module performs such a transformation. As shown in FIG. 3, the DQ/XY vector rotation module transforms the commanded stator voltage vector from the stator flux reference frame to a phase voltage reference frame.

In an action 808, the commanded stator voltage vector from the phase voltage reference frame is processed to produce AC power for the induction motor. For example, the space vector modulation unit and the DC/AC inverter perform such processing. As shown in FIG. 3, the space vector modulation unit processes the commanded stator voltage vector, after transformation to the phase voltage frame, to produce pulse width modulation switching controls. The DC/AC inverter then processes the pulse width modulation switching controls to produce alternating current (AC) power for the induction motor.

In one embodiment, processing as part of the torque regulator loop, for the action 802, includes further actions that can be performed, for example, on or by the torque regulator of FIG. 6. In this embodiment, processing as part of the torque regulator loop includes generating the quadrature axis projection of the commanded stator voltage vector, expressed in the stator flux reference frame. This can be performed by subtracting the estimated torque from the commanded torque to form a torque error. Adding a first term proportional to the torque error and a second term proportional to an integral of the torque error forms a PI (proportional-integral) controller output. Multiplying the rotational speed of the rotor by the commanded rotor flux forms a feedforward quantity. Adding the feedforward quantity to the PI controller output forms the quadrature axis projection of the commanded stator voltage vector in the stator flux reference frame.

In one embodiment, processing as part of the rotor flux regulator loop, for the action 804, includes further actions that can be performed, for example, on or by the rotor flux regulator of FIG. 7. In this embodiment, processing as part of the rotor flux regulator loop includes generating the direct axis projection of the commanded stator voltage vector, expressed in the stator flux reference frame. This can be performed by subtracting the estimated rotor flux from the commanded rotor flux to form a flux error. Adding a first term proportional to the flux error, a second term proportional to an integral of the flux error, and a third term proportional to a derivative of the flux error forms the direct axis projection of the commanded stator voltage vector in the stator flux reference frame.

Various embodiments of the present induction motor controller, as described above with reference to FIGS. 1-8, have some or all of the following characteristics and features. Rotor flux and torque control are performed with a rotor flux regulator loop and a torque regulator loop, without current regulation loops. The rotor flux and the torque regulator loops are processed in a stator flux reference frame. Quantities in the stator flux reference frame are identified as "dq". Quantities in the stator stationary reference frame are identified as "xy".

A flux and torque estimator is followed by a flux and torque limiter. The flux and torque estimator inputs are sensed motor phase currents, sensed or computed phase voltages, and sensed motor speed. The outputs are estimated rotor flux magnitude, torque magnitude, stator flux angle, and stator and rotor circuit currents in the "dq" reference frame. The stator flux angle, relative to the stator stationary frame, is used to perform vector rotation between "dq" and "xy".

The flux and torque limiter runs in real-time at the same sampling rate (or slower sampling rate) compared to the main loop sampling rate. The flux and torque limiter determines a maximum torque command and a maximum and a minimum rotor flux magnitude. The basis of the design of this limiter block is a comprehensive motor physical model that defines the operating limits of the motor system as functions of battery bus voltage, sensed motor speed, and sensed inverter and motor operating temperatures.

One benefit of the flux and torque limiter is that the stator current and rotor current are individually limited. With the direct torque (in DTC), neither the stator nor the rotor current is directly regulated or limited. With the field orientation control (FOC), only the stator current is directly regulated and the rotor current is neither regulated nor limited in some embodiments.

Flux and torque command generators adaptively generate flux and torque commands in real-time, at the same or slower sampling rate as the main loop sampling rate.

One benefit of rotor flux regulation is that the rotor flux generally contains less harmonics than the stator flux and the airgap flux, resulting in improved control accuracy and reduced system jittering. In addition, the rotor flux slightly lags in phase the stator flux and the airgap flux, which may result in improved system stability and improved peak torque envelope limits.

One benefit of processing the main control loop in a reference frame aligned to the stator flux is that the stator flux angle computation can be more accurate and can converge faster, than computing a rotor flux angle.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An induction motor controller, comprising:
a controller, configured to couple to one or more sensors and an induction motor having a stator and a rotor, the controller having a first module and a second module;
the first module derives a commanded stator voltage vector, in a stator flux reference frame, via a rotor flux regulator loop and a torque regulator loop, which process at least partially in the stator flux reference frame; and
the second module processes the commanded stator voltage vector to produce AC (alternating current) power for the induction motor.

2. The induction motor controller of claim 1, wherein:
the second module transforms the commanded stator voltage vector from the stator flux reference frame to a phase voltage reference frame, applying vector rotation according to a stator flux angle;
the second module generates pulse width modulation switching controls for a DC (direct current) to AC inverter from the commanded stator voltage vector as transformed to the phase voltage reference frame; and
the second module generates three-phase AC power for the induction motor from the pulse width modulation switching controls.

3. The induction motor controller of claim 1, further comprising:
a third module that produces a torque, a stator flux angle, a rotor flux, a stator current vector expressed in the stator flux reference frame, and a rotor current vector expressed in the stator flux reference frame, from a stator voltage vector expressed in a phase voltage reference frame, a stator current of at least two phases, and a rotational speed of a rotor of the induction motor.

4. The induction motor controller of claim 3, wherein:
the rotor flux is coupled from the third module to a flux regulator of the first module;
the torque is coupled from the third module to a torque regulator of the first module;
the stator flux angle is coupled from the third module to the second module;
the stator voltage vector expressed in the phase voltage reference frame is produced by the second module from the commanded stator voltage vector expressed in the stator flux reference frame; and
the stator current of at least two phases is provided by the second module.

5. The induction motor controller of claim 1, further comprising:
   a third module that applies a rotor flux current model and a rotor flux voltage model to generate a rotor flux and a torque, wherein the rotor flux regulator loop includes the rotor flux as an input to the first module, and the torque regulator loop includes the torque as an input to the first module.

6. The induction motor controller of claim 1, further comprising:
   a fourth module that generates a commanded torque and a commanded rotor flux, limiting the commanded torque to less than or equal to a maximum commanded torque and limiting the commanded rotor flux to greater than or equal to a minimum commanded rotor flux and less than or equal to a maximum commanded rotor flux, the commanded torque and the commanded rotor flux coupled as inputs to the first module.

7. The induction motor controller of claim 1, wherein:
   the first module includes a torque regulator that processes a portion of the torque regulator loop and produces a projection of the commanded stator voltage vector onto a quadrature axis in the stator flux reference frame; and
   the first module includes a rotor flux regulator that processes a portion of the rotor flux regulator loop and produces a projection of the commanded stator voltage vector onto a direct axis in the stator flux reference frame.

8. An induction motor controller, comprising:
   a controller, having a torque regulator, a rotor flux regulator and a stator flux reference frame to phase voltage reference frame vector rotation module, the controller configured to couple to at least one sensor and an induction motor having a stator and a rotor;
   the torque regulator processes in a stator flux reference frame a commanded torque, a torque, a commanded rotor flux, and a rotational speed of a rotor of an induction motor, to produce a commanded stator voltage projected onto a quadrature axis in the stator flux reference frame;
   the rotor flux regulator processes in the stator flux reference frame the commanded rotor flux and a rotor flux, to produce the commanded stator voltage projected onto a direct axis in the stator flux reference frame; and
   the stator flux reference frame to phase voltage reference frame vector rotation module applies a stator flux angle to transform the commanded stator voltage, as projected onto the direct axis and the quadrature axis, from a first vector expressed in the stator flux reference frame to a second vector expressed in the phase voltage reference frame.

9. The induction motor controller of claim 8, further comprising:
   a flux and torque estimator that generates the stator flux angle, the rotor flux, the torque, a rotor current vector expressed in the stator flux reference frame, and a stator current vector expressed in the stator flux reference frame, from a stator voltage vector expressed in the phase voltage reference frame, a stator current of at least two phases, and the rotational speed of the rotor; and
   the flux and torque estimator including a phase voltage reference frame to stator flux reference frame vector rotation module that transforms current vectors from the phase voltage reference frame to the stator flux reference frame.

10. The induction motor controller of claim 8, further comprising a flux and torque estimator that includes:
    a stator phase current reference frame to phase voltage reference frame vector rotation module that transforms a stator current of at least two phases to a stator current vector expressed in the phase voltage reference frame;
    a rotor flux current model that generates a first rotor flux vector expressed in the phase voltage reference frame from the stator current vector expressed in the phase voltage reference frame and the rotational speed of the rotor;
    a rotor flux voltage model that generates a second rotor flux vector expressed in the phase voltage reference frame from a stator voltage vector expressed in the phase voltage reference frame, the stator current vector expressed in the phase voltage reference frame, and an estimation correction factor;
    an estimator regulator that generates the estimation correction factor from the first rotor flux vector expressed in the phase voltage reference frame and the second rotor flux vector expressed in the phase voltage reference frame;
    a rotor flux magnitude calculator that generates the rotor flux from the first rotor flux vector expressed in the phase voltage reference frame;
    a stator flux calculator that generates a stator flux vector expressed in the phase voltage reference frame from the second rotor flux vector expressed in the phase voltage reference frame and the stator current vector expressed in the phase voltage reference frame;
    a rotor current calculator that generates a rotor current vector expressed in the phase voltage reference frame from the first rotor flux vector expressed in the phase voltage reference frame and the stator flux vector expressed in the phase voltage reference frame;
    a torque calculator that generates the torque from the stator current vector expressed in the phase voltage reference frame and the stator flux vector expressed in the phase voltage reference frame;
    a stator flux angle calculator that generates the stator flux angle from the stator flux vector expressed in the phase voltage reference frame; and
    a phase voltage reference frame to stator flux reference frame vector rotation module that generates the rotor current vector expressed in the stator flux reference frame and the stator current vector expressed in the stator flux reference frame, from the rotor current vector expressed in the phase voltage reference frame, the stator current vector expressed in the phase voltage reference frame, and the stator flux angle.

11. The induction motor controller of claim 10, wherein:
    the estimator regulator includes a PI (proportional-integral) controller;
    the stator flux calculator includes a model of inductances for windings of the induction motor;
    the stator flux reference frame to phase voltage reference frame vector rotation module performs a second transformation that is an inverse of a first transformation performed by the phase voltage reference frame to stator flux reference frame vector rotation module; and
    each of the rotor flux current model, the rotor flux voltage model, the rotor flux magnitude calculator, the rotor current calculator, the stator flux calculator, the torque calculator and the stator flux angle calculator is lookup-table-based or real-time-calculation-based.

12. The induction motor controller of claim 8, further comprising:
- a space vector modulation module that generates pulse width modulation (PWM) switching controls, and generates a stator voltage vector expressed in the phase voltage reference frame, from the commanded stator voltage received as the second vector and a DC (direct current) voltage of a power source; and
- a DC to AC (alternating current) inverter that generates three-phase AC power for the induction motor from the PWM switching controls.

13. The induction motor controller of claim 8, further comprising:
- a flux and torque limiter that generates a minimum commanded rotor flux, a maximum commanded rotor flux, and a maximum commanded torque, from a stator current vector expressed in the stator flux reference frame, a rotor current vector expressed in the stator flux reference frame, an inverter temperature, a motor temperature, and the rotational speed of the rotor.

14. The induction motor controller of claim 8, further comprising a flux and torque limiter that includes:
- a rotor current limiter that generates a maximum rotor current from the rotational speed of the rotor, a rotor current vector expressed in the stator flux reference frame, and a motor temperature;
- a field weakener that generates a maximum stator flux from the rotational speed of the rotor and a DC (direct current) voltage of a power source;
- a stator current limiter that generates a maximum stator current from the rotational speed of the rotor, a stator current vector expressed in the stator flux reference frame, and an inverter temperature;
- a low rotor flux limiter that generates a minimum commanded rotor flux from the maximum rotor current and the rotational speed of the rotor;
- a high rotor flux limiter that generates a maximum commanded rotor flux from the maximum stator flux and the maximum stator current;
- a stator-based torque limiter that generates a maximum stator-based commanded torque from the maximum stator flux and the maximum stator current;
- a rotor-based torque limiter that generates a maximum rotor-based commanded torque from the maximum rotor current and the maximum commanded rotor flux; and
- a final torque limiter that generates a maximum commanded torque from the maximum rotor-based commanded torque and the maximum stator-based commanded torque;
- wherein each of the rotor current limiter, the field weakener, the stator current limiter, the low rotor flux limiter, the high rotor flux limiter, the stator-based torque limiter, and the rotor-based torque limiter is lookup-table-based or real-time-calculation-based.

15. The induction motor controller of claim 8, further comprising a flux and torque limiter that includes:
- a rotor current limiter that decreases a maximum rotor current in response to an increased motor temperature;
- a field weakener that decreases a maximum stator flux in response to the rotational speed of the rotor exceeding a base speed and further decreases the maximum stator flux in response to a decreasing DC (direct current) voltage of a power source;
- a stator current limiter that decreases a maximum stator current in response to an increased inverter temperature;
- a low rotor flux limiter that sets a minimum commanded rotor flux consistent with readiness to accelerate the rotor;
- a high rotor flux limiter that sets a maximum commanded rotor flux based upon the maximum stator flux and the maximum stator current;
- a stator-based torque limiter that sets a maximum stator-based commanded torque based upon a product of the maximum stator flux and the maximum stator current;
- a rotor-based torque limiter that sets a maximum rotor-based commanded torque based upon a product of the maximum rotor current and the maximum commanded rotor flux; and
- a final torque limiter that sets a maximum commanded torque selected as a lesser of the maximum rotor-based commanded torque and the maximum stator-based commanded torque.

16. The induction motor controller of claim 8, further comprising:
- a torque command generator that generates the commanded torque from a maximum commanded torque and an initial commanded torque, the maximum commanded torque applied to the initial commanded torque as a torque limit; and
- a rotor flux command generator that generates the commanded rotor flux from a minimum commanded rotor flux, a maximum commanded rotor flux, and the commanded torque, the minimum commanded rotor flux and the maximum commanded rotor flux applied to the commanded rotor flux as flux limits.

17. The induction motor controller of claim 8, wherein:
- the torque regulator includes a proportional-integral (PI) controller having a difference between the commanded torque and the torque as an input; and
- the torque regulator includes a feedforward summation having as inputs an output of the PI controller and a product of the commanded rotor flux and the rotational speed of the rotor, the feedforward summation having as an output the commanded stator voltage projected onto the quadrature axis in the stator flux reference frame.

18. The induction motor controller of claim 8, wherein:
- the rotor flux regulator includes a proportional-integral-derivative (PID) controller having as inputs the commanded rotor flux and the rotor flux, and having as an output the commanded stator voltage projected onto the direct axis in the stator flux reference frame.

19. A controller-based method of controlling an induction motor, comprising:
- generating a stator voltage vector, in a stator flux reference frame, the generating including,
  - generating a quadrature axis projection of a commanded stator voltage vector expressed in the stator flux reference frame from a commanded torque, a torque, a commanded rotor flux, and a rotational speed of a rotor of the induction motor; and
  - generating a direct axis projection of the commanded stator voltage vector expressed in the stator flux reference frame from the commanded rotor flux and a rotor flux, wherein the stator voltage vector, in the stator flux reference frame, includes the direct axis projection of the commanded stator voltage vector and the quadrature axis projection of the commanded stator voltage vector;
- transforming the stator voltage vector from the stator flux reference frame to a phase voltage reference frame; and
- producing alternating current (AC) power for an induction motor, from the stator voltage vector of the phase voltage reference frame, wherein at least one step of the method is performed by a processor.

20. The method of claim 19, wherein generating the quadrature axis projection of the commanded stator voltage vector expressed in the stator flux reference frame includes:
- subtracting the torque from the commanded torque to form a torque error;
- adding a first term proportional to the torque error and a second term proportional to an integral of the torque error to form a PI (proportional-integral) controller output;
- multiplying the rotational speed of the rotor by the commanded rotor flux to form a feedforward quantity; and
- adding the feedforward quantity to the PI controller output to form the quadrature axis projection of the commanded stator voltage vector expressed in the stator flux reference frame.

21. The method of claim 19, wherein generating the direct axis projection of the commanded stator voltage vector expressed in the stator flux reference frame includes:
- subtracting the rotor flux from the commanded rotor flux to form a flux error; and
- adding a first term proportional to the flux error, a second term proportional to an integral of the flux error, and a third term proportional to a derivative of the flux error to form the direct axis projection of the commanded stator voltage vector expressed in the stator flux reference frame.

* * * * *